United States Patent
Bhaskaran et al.

(10) Patent No.: US 10,530,939 B2
(45) Date of Patent: Jan. 7, 2020

(54) CORRECTING CAPTURED IMAGES USING A REFERENCE IMAGE

(71) Applicants: Hewlett-Packard Development Company, L.P., Houston, TX (US); Shinoji Bhaskaran, Bangalore (IN); Pooja, Bangalore (IN)

(72) Inventors: Shinoji Bhaskaran, Bangalore (IN); Pooja, Bangalore (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/774,943

(22) PCT Filed: Mar. 4, 2016

(86) PCT No.: PCT/IN2016/050077
§ 371 (c)(1),
(2) Date: May 9, 2018

(87) PCT Pub. No.: WO2017/149549
PCT Pub. Date: Sep. 8, 2017

(65) Prior Publication Data
US 2018/0367680 A1 Dec. 20, 2018

(51) Int. Cl.
H04N 1/00 (2006.01)
H04N 1/409 (2006.01)
H04N 1/047 (2006.01)
H04N 1/60 (2006.01)

(52) U.S. Cl.
CPC ..... *H04N 1/00018* (2013.01); *H04N 1/00005* (2013.01); *H04N 1/00037* (2013.01); *H04N 1/00084* (2013.01); *H04N 1/047* (2013.01); *H04N 1/4097* (2013.01); *H04N 1/6094* (2013.01)

(58) Field of Classification Search
CPC .................................................. H04N 1/4097
See application file for complete search history.

(56) References Cited

U.S. PATENT DOCUMENTS 4,646,355 A * 2/1987 Petrick ................... H04N 1/409
358/3.26
4,698,843 A * 10/1987 Burt ....................... H04N 19/63
348/616

(Continued)

FOREIGN PATENT DOCUMENTS

| CN | 1196633 A | * 10/1998 |
| CN | 101848309 A | 9/2010 |
| JP | 2002359742 A | 12/2002 |

OTHER PUBLICATIONS

Fuji Film Digital Minilab ~ "A High-Capacity Minilab for the Digital World now Easier than ever to use" ~ 2003 ~ 9 pages.

*Primary Examiner* — Ted W Barnes
(74) *Attorney, Agent, or Firm* — HP Inc. Patent Department

(57) ABSTRACT

A reference image of an image capture device is processed to detect multiple image flaws caused by defects or corruption items of the image capture device (510). Data corresponding to an image map of flaws for the image capture device are stored (520). For subsequent images, flaws in the captured image are corrected using the image map of flaws (530).

12 Claims, 4 Drawing Sheets

(56) References Cited

U.S. PATENT DOCUMENTS

| | | | | |
|---|---|---|---|---|
| 5,214,470 A * | 5/1993 | Denber | H04N 1/4097 | 355/75 |
| 5,583,950 A * | 12/1996 | Prokoski | G06F 17/153 | 382/212 |
| 5,694,228 A * | 12/1997 | Peairs | H04N 1/4097 | 358/448 |
| 6,160,923 A | 12/2000 | Lawton et al. | | |
| 6,498,867 B1 * | 12/2002 | Potucek | H04N 1/00092 | 356/237.2 |
| 6,694,062 B1 * | 2/2004 | Yang | H04N 1/401 | 358/463 |
| 6,728,418 B1 * | 4/2004 | Kumagai | H04N 1/1906 | 382/172 |
| 7,119,926 B2 * | 10/2006 | Takeda | H04N 1/00002 | 358/1.9 |
| 7,253,932 B2 * | 8/2007 | Tsutsumi | H04N 1/00002 | 358/448 |
| 7,634,151 B2 * | 12/2009 | Bergman | H04N 5/367 | 382/149 |
| 8,174,732 B2 | 5/2012 | Oteki | | |
| 2002/0106134 A1 * | 8/2002 | Dundon | G01N 21/94 | 382/274 |
| 2002/0181719 A1 | 12/2002 | Yamaguchi | | |
| 2002/0181759 A1 * | 12/2002 | Yamaguchi | H04N 1/00092 | 382/149 |
| 2003/0090742 A1 * | 5/2003 | Fukuda | H04N 1/04 | 358/448 |
| 2003/0118249 A1 * | 6/2003 | Edgar | G06T 7/0002 | 382/275 |
| 2004/0263915 A1 * | 12/2004 | Park | H04N 1/4076 | 358/461 |
| 2005/0001910 A1 * | 1/2005 | Hoshuyama | H04N 1/32128 | 348/231.6 |
| 2005/0068450 A1 * | 3/2005 | Steinberg | G06K 9/346 | 348/335 |
| 2005/0068452 A1 * | 3/2005 | Steinberg | H04N 1/4097 | 348/335 |
| 2006/0285174 A1 | 12/2006 | Jeon | | |
| 2007/0064283 A1 * | 3/2007 | Shiokawa | H04N 1/00572 | 358/496 |
| 2007/0122056 A1 * | 5/2007 | Steinberg | G06K 9/346 | 382/275 |
| 2007/0216962 A1 * | 9/2007 | Inage | H04N 1/401 | 358/461 |
| 2008/0036982 A1 * | 2/2008 | Wegmann | G03F 7/70258 | 355/44 |
| 2008/0100879 A1 * | 5/2008 | Lee | H04N 1/401 | 358/461 |
| 2008/0118172 A1 * | 5/2008 | Kim | H04N 1/401 | 382/260 |
| 2008/0212825 A1 * | 9/2008 | Hatzav | G03B 15/00 | 382/100 |
| 2008/0259233 A1 * | 10/2008 | Krijn | H04N 13/302 | 349/15 |
| 2009/0073504 A1 * | 3/2009 | Lee | H04N 1/4076 | 358/461 |
| 2009/0185204 A1 * | 7/2009 | Wu | H04N 1/60 | 358/1.9 |
| 2010/0091339 A1 * | 4/2010 | Kwon | H04N 1/00572 | 358/461 |
| 2011/0122459 A1 * | 5/2011 | Do | H04N 1/00795 | 358/474 |
| 2011/0149331 A1 * | 6/2011 | Duggan | G06K 9/036 | 358/1.14 |
| 2013/0050767 A1 * | 2/2013 | Stuart | H04N 1/00005 | 358/3.26 |
| 2013/0229482 A1 * | 9/2013 | Vilcovsky | H04N 7/144 | 348/14.07 |
| 2014/0071499 A1 * | 3/2014 | Hayashide | H04N 1/00013 | 358/474 |
| 2015/0365557 A1 * | 12/2015 | Ko | H04N 1/1026 | 358/474 |
| 2016/0110940 A1 * | 4/2016 | Huang | G07D 7/2008 | 382/137 |
| 2016/0188993 A1 * | 6/2016 | Beato | G06K 9/46 | 382/163 |

* cited by examiner

CORRECTING CAPTURED IMAGES USING A REFERENCE IMAGE

BACKGROUND

Image capture devices, such as scanners, are widely used to capture digital or electronic images of documents and artifacts. Such image capture devices have numerous applications for consumers and enterprises, including applications for photocopying and printing.

DETAILED DESCRIPTION

Figure 1:
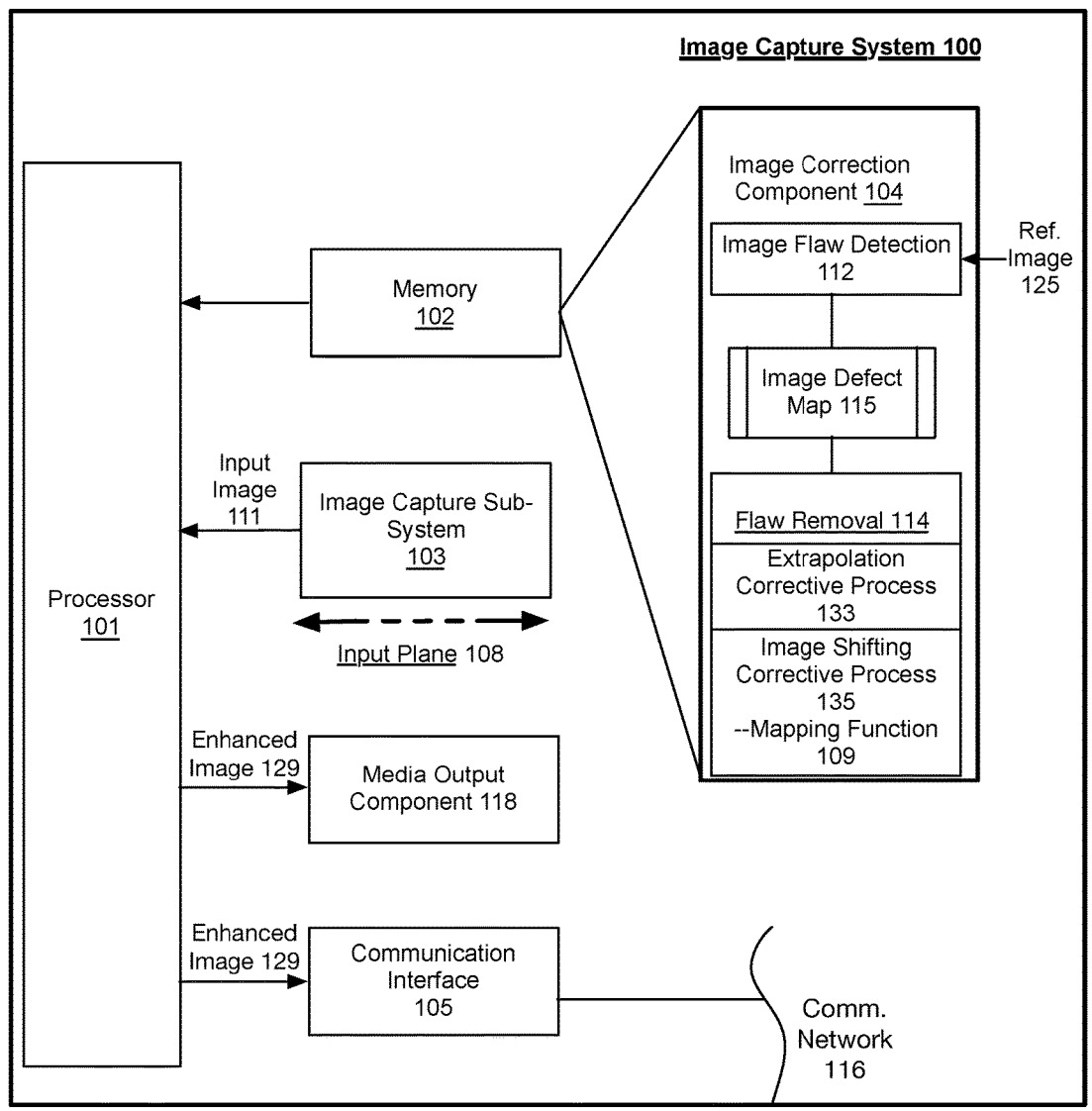
FIG. 1 illustrates an example image capture system that operates to eliminate flaws resulting from equipment defects and image corruption items.

Examples include an image capture device that uses a reference image to identify and correct for image flaws resulting from equipment defect, debris and/or other image corruption items. According to some examples, a reference image of an image capture device is processed to detect image flaws caused by equipment defects and other corruption items. An image map of flaws is stored for the image capture device, and for subsequent images, flaws in the captured image are corrected using the image map of flaws.

Still further, in some examples, an example scanner automatically corrects a scanned image to reduce or eliminate flaws that result from defects of the scanner equipment, or from presence of extraneous image corruption items. As a result, examples enable scanned images to be substantially clean of dark spots or other markings which would otherwise appear because of scratches or debris on the scan bed. In this respect, examples provide a benefit and technical effect of eliminating the need for time consuming and expensive manual processes to clean, repair or replace the glass or lens of scanners or other image capturing devices.

According to some examples, data associated with at least one equipment defect or image corrupting item of an image capture device is stored. When image capture is performed (e.g., scanner scans a document), image correction is performed on the scanned image using the stored data.

In some examples, a scanner includes a memory that stores a set of instructions and one or more processors that access the set of instructions to implement image correction on scanned images. The scanner operates to store data which identifies image flaws that appear on scanned images because of equipment defects, debris or other image corruption items that affect the reflection of the document or artifact being scanned on a scan bed. When scanning is subsequently performed, the scanner implements image correction on regions of the scanned image that corresponds to the stored data representing the image flaws.

Aspects described herein provide that methods, techniques and actions performed by a computing device (e.g., image processing device or scanner) are performed programmatically, or as a computer-implemented method. Programmatically means through the use of code, or computer-executable instructions. A programmatically performed step may or may not be automatic.

Examples described herein can be implemented using components, logic or processes, which may be implemented with any combination of hardware and programming, to implement the functionalities described. In examples described herein, such combinations of hardware and programming may be implemented in a number of different ways. For example, the programming for the components, logic or processes may be processor executable instructions stored on at least one non-transitory machine-readable storage medium, and the corresponding hardware for the may include at least one processing resource to execute those instructions. In such examples, the at least one machine-readable storage medium may store instructions that, when executed by the at least one processing resource, implement functionality described with a particular component. In examples, a system may include the machine-readable storage medium storing the instructions and the processing resource to execute the instructions, or the machine-readable storage medium may be separate but accessible to the system and the processing resource.

Furthermore, aspects described herein may be implemented through the use of instructions that are executable by a processor or combination of processors. These instructions may be carried on a non-transitory computer-readable medium. Computer systems shown or described with figures below provide examples of processing resources and non-transitory computer-readable mediums on which instructions for implementing some aspects can be stored and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

FIG. 1 illustrates an example image capture system 100 that operates to eliminate flaws that appear in captured images of objects as a result of defects in equipment and/or presence of image corruption items. According to some examples, the image capture system 100 includes a processor 101, a memory 102, an image capture sub-system 103 and a communication interface 105. In some variations, the image capture system 100 includes a media output component 118. The image capture sub-system 103 captures images of objects (e.g., documents, artifacts, etc.) which are framed through an input image plane 108. The memory 102 can include non-transitory memory, such as random access memory (RAM) or other dynamic storage device, to store instructions which are executable by the processor 101. In particular, the memory 102 can store instructions for implementing an image correction component 104 for correcting flaws in images that are captured by the image capture sub-system 103. According to some examples, the image correction component 104 includes logic that (i) performs a reference image scan, using for example, white background, (ii) uses image data from the reference image scan to spatially identify locations of flaws which are the result of defects with the image capture sub-system 103, and (iii) performs multiple scans of a document or object at different orientations in order to identify pixel data corresponding to where flaws are determined to exist with the reference image. In some variations, the processor 101 and memory 102 can be provided as part of a controller sub-system or controller device within the image capture system 100. The processor 101 can execute the instructions stored in the memory 102 to implement, among other functionality, processes of the image correction component 104 in connection with other operations for capturing images.

According to some examples, the image capture sub-system 103 can include equipment components and physical structures, as well as other elements such as sensors, light sources, and logic for capturing images. In some examples, such as described with FIG. 2, the image capture sub-system 103 can correspond to a scanner. In some examples, the processor 101 can act as a controller for the image capture sub-system 103. The image capture sub-system 103 can communicate an image input 111 to the processor 101, which in turn executes the image correction component 104 to implement operations to eliminate flaws in the image input 111 which are the result of the defects with the image capture sub-system 103.

In some examples, the image correction component 104 can include image flaw detection logic 112 and flaw removal logic 114. The image flaw detection logic 112 can process a reference image 125 to identify persistent image flaws which are attributable to defects of the image capture sub-system 103. The reference image 125 can correspond to an image that is captured by the image capture sub-system 103 in a manner that isolates or accentuates the appearance of flaws in the image which are the results of defects of image capture sub-system 103. In some examples, the reference image 125 is captured from a reflective and homogeneous reference medium, against which flaws attributable to defects and corruption items can be isolated. For example, many scanners are equipped with a white, reflective backing that can be placed over a document that is positioned on the scan bed. For such scanners, an image of the white reflective backing can be used as the reference image 125. Still further, the reference image 125 can be taken from a white media or a specialized media which otherwise accentuates or isolates flaws (e.g., debris affixed to glass, scratches) as darkened spots.

In this way, the image flaw detection logic 112 can detect, acquire and store data that is characteristic of flaws created by equipment defect or corrupting item of the image capture sub-system 103. The characteristic data can define image flaws resulting from defects or image corruption items of the image capture sub-system 103 by one or more of pixel location, flaw shape (or perimeter shape), and/or relative flaw dimension(s). According to some examples, the image flaw detection logic 112 can be used to generate an image defects map 115, which can map persistent defects of the image capture sub-system 103 to specific points of an image captured through the image capture sub-system 103.

The image defects map 115 can be determined periodically in advance of, for example, a series or image capture operations. In variations, the image defects map 115 can be implemented as a preliminary step before an image capture job (e.g., scan job such as described with an example of FIG. 2). In some variations, the process by which the image defects map 115 is obtained can be automated. For example, in implementations in which the image capture sub-system 103 is a document or artifact scanner, mechanical controls can be used to selectively place a white reflective medium (e.g., white media stored in a separate tray) over the scan area (e.g., glass) when the image defects map 115 is to be obtained.

The image correction component 104 can include flaw removal logic 114, which uses the image defects map 115 to detect and remove flaws of subsequently captured images. The flaw removal logic 114 can utilize at least one corrective process to reduce or eliminate image flaws which are presumed present on the input image 111 of a given object.

In some variations, the flaw removal logic 114 uses an extrapolation based corrective process 133 to modify the pixel values of individual pixels that form flaws of a captured image, based on the image defects map 115. The extrapolation based corrective process 133 can modify pixels that depict flaws in the captured image, as identified by the image defects map 115. The pixels of the flaws can be modified based on pixel values of neighboring pixels. In some examples, the pixel values for individual pixels of the identified flaws can be extrapolated from respective neighboring pixels. The extrapolation can replicate or blend pixels of individual flaws in accordance with values of adjacent pixels.

In other variations, the flaw removal logic 114 implements an image shifting corrective process 135 in which image capture sub-system 103 captures separate images of a given object at different orientations and/or alignments relative to a reference of the input plane 108. The image capture sub-system 103 captures a first image of the object at an orientation or alignment that correlates to the reference or alignment of the reference image 125. The flaw removal logic 114 can identify, from the image defects map 115, pixel sets of the first image which correlate to flaws. The flaw removal logic 114 can then identify pixels in the second image which correspond to the pixel sets of the first image which are identified as flaws. The pixel values of the corresponding pixels of the second image can serve as corrective pixel values which replace the pixel values of those pixels of the first image which are identified as flaws.

In some examples, the correspondence between pixels of the first and second images can be determined by implementing a mapping function 109 that correlates pixels of the first image to those of the second pixel. The mapping function 109 can reflect the variation of the first and second images with respect to orientation and/or alignment of the objects relative to the reference of the input plane 108. The mapping function 109, or a variant thereof, can also be used to map the corrective pixel values, as determined from the second image, to pixels of the first image which identify the flaws. In addition, pixel values amongst neighboring pixels that are included in or near the flaws can be blended (e.g., averaged, duplicated) to smooth the use of the corrective pixel values in the first image.

The image capture system 100 can use an outcome of one or both of the corrective processes 133, 135 to generate an enhanced image 129 of the object. The enhanced image 129 can be printed or outputted via the media output component 118. As an addition or variation, the enhanced image 129 can be generated for output on a display, or communicated over a communication network 116 via the communication interface 105.

Figure 2:
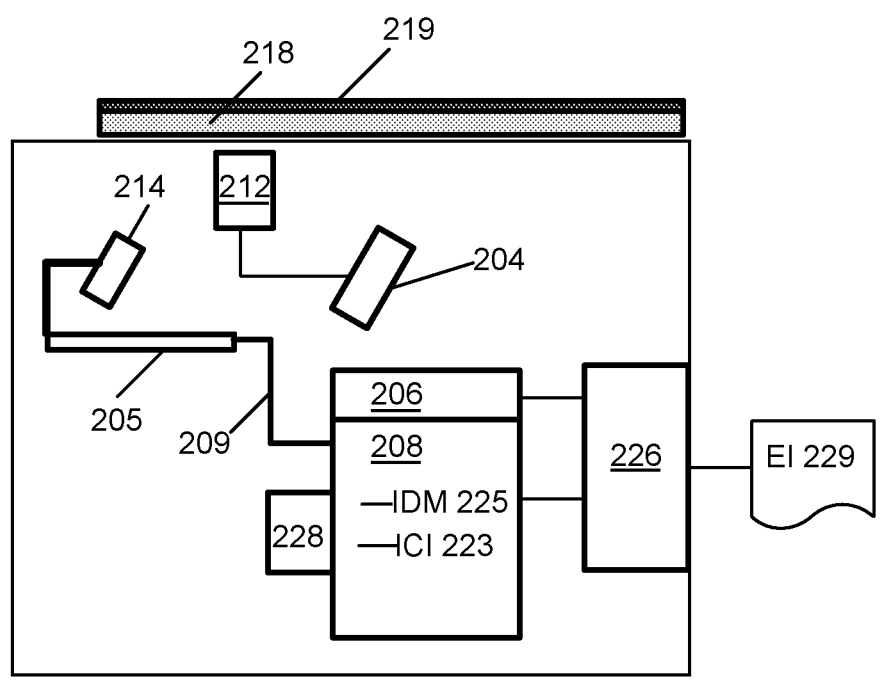
FIG. 2 illustrates an example scanner that implements image correction.

FIG. 2 illustrates an example scanner that implements image correction. In FIG. 2, a scanner 200 can correspond to, for example, a flatbed scanner which can output a scanned image on media (e.g., paper). By way of example, the scanner can be implemented as an enterprise or consumer device that digitizes documents and/or makes photocopies (or print copies). The scanner 200 can include functionality such as described with the image correction component 104 in order to detect and eliminate flaws which are attributable to defects and corruption items of image capture sub-system 103.

While the construction of scanner 200 can vary based on implementation, in an example of FIG. 2, the scanner 200 includes a controller 206, a light source 212, transparent surface 218 (e.g., glass) on which a document can be placed (e.g., a scan bed), a combination of mirrors 204, 214, an array of light sensors 205 and a memory resources 208. The communication component 228 can include a wireless or wireless communication port, such as, for example, an Ethernet network interface, Bluetooth port, or Wi-Fi port.

The scanner may operate by emitting light from the light source, and then by capturing a reflection of the emitted light on the array of light sensors 205. In the context of a scanner, defects in equipment and/or image corruption items (e.g., debris) affect the reflection of light from the light source 212.

When a document is placed on the transparent surface 218, the controller 206 can direct the light source and one of the mirrors ("moveable mirror 204") to move underneath the transparent surface 218 along a length that represents at least a substantial portion of the document. In one implementation, the reflection medium 219 can be placed over a document or artifact that is placed on the transparent surface 218. In one example of FIG. 2, the scanning process is initiated, and the light source 212 emits light while moving underneath the document or artifact. Reflected light from the document or artifact (backed by the reflection medium 219) is cast onto the moveable mirror 204, which then directs light to the sensor array 205 via another mirror 214. A data bus 209 can transfer image data 221 as determined from sensor array 205 to the memory resource 208. The controller 206 and/or image processing resources (e.g., circuitry provided with the sensor array 205) can convert the raw sensor data to a scanned image. The controller 206 (or other processing resource as described below) can further implement operations to correct the scanned image of image flaws resulting from equipment defects and/or image corruption items.

In some aspects, the memory resource 208 can store images captured through use of the sensor array 205, as well as instructions for implementing image correction processes such as described with image correction component 104 (see FIG. 1). In an example of FIG. 2, the controller 206 can include a processor (or combination of processors) which control the components of the scanner 200, as well as execute image correction instructions 223 stored with memory resources 208. The controller 206 can execute image correction instructions 223 in order to implement functionality for detecting and eliminating flaws from a scanned image which are attributable to defects (e.g., scratches in the transparent surface 218, variations in output of the light source 212) and corruption items (e.g., dirt, debris on the transparent surface 218). In variations, the scanner 200 can utilize separate processors or processing resources to implement image processing, and more specifically, image correction in accordance with examples as described. Still further, in other variations, the scanner 200 can utilize an external processor or computing device to implement image-processing functions provided by image correction instructions 223. As described below, the image correction instructions 223 can be used to implement each of a flaw detection mode and an image capture mode.

In the flaw detection mode, the controller 206 can process the image input communicated from the sensor array 205 as the reference image (see FIG. 1). The flaw detection mode can provide for a blank or "zero image" generated from an image capture of a homogeneous (e.g., white surface) medium. In some examples, the reference image 125 (see FIG. 1) is generated by placing the reflection medium 219 over the transparent surface 218 and then performing a scan operation without any document or artifact being present on the transparent surface 218. In some examples, the reflection medium 219 can be white, or substantially white, and a resulting zero image can identify flaws as black or darkened areas (against white backdrop). In this manner, the zero image can correspond to the reference image and can be stored in the memory resources 208. Based on the reference image, the controller 206 can store a map of image flaws ("defects map 225"), which are image features (e.g., darkened spots) identified from the reference image which is otherwise homogenous (e.g., all white). The defects map 225 can identify a relative location of image flaws which will likely appear in subsequently scanned images. In some examples, the defects map 225 can identify pixels, sets of pixels and/or boundaries for each image flaw, by relative location (e.g., pixel identifier, X-Y coordinates, etc.).

In the image capture mode, the controller 206 can use the image defects map 225 to implement image capture and flaw correction operations, in order to generate an enhanced image output 239. In some examples, the controller 206 implements an extrapolation based corrective process 133 which uses the image defects map to identify the pixel values which are to be replaced, and then uses the neighboring pixel values to extrapolate the corrective pixel value. An example of the extrapolation based corrective process 133 is illustrated with an example of FIG. 3A and FIG. 3B.

Still further, in other examples, the controller 206 implements an image shifting corrective process 135 (see FIG. 1) by capturing an image of the document or artifact from multiple orientations or alignments, and then using the defects map 225 to identify corrective pixel values from one of the images for use in place of flawed areas of another of the images. An example of the image shifting corrective process 135 is illustrated with FIG. 4.

In some examples, the scanner 200 can include a media output component 226 and a communication component 228. The media output component 226 can generate a media output 229 of a scanned image (e.g., paper output). The media output 229 can provide a rendering of the enhanced image output 229. Alternatively, the enhanced image output 239 can be stored and/or communicated to other computing devices via the communication port 228.

Figure 3A:
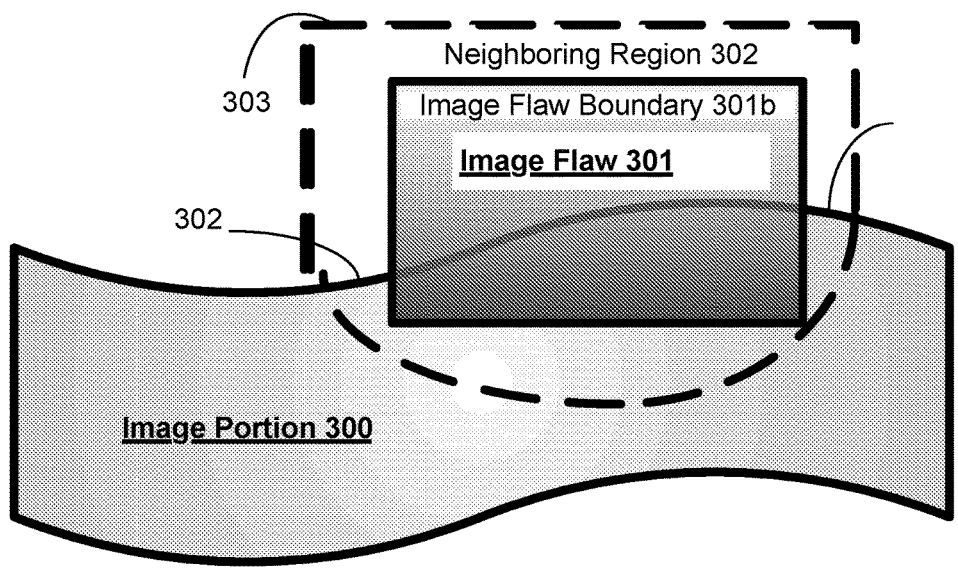
FIG. 3A and FIG. 3B illustrate an example of image correction implemented on image portions captured with an example scanner.
Figure 3B:
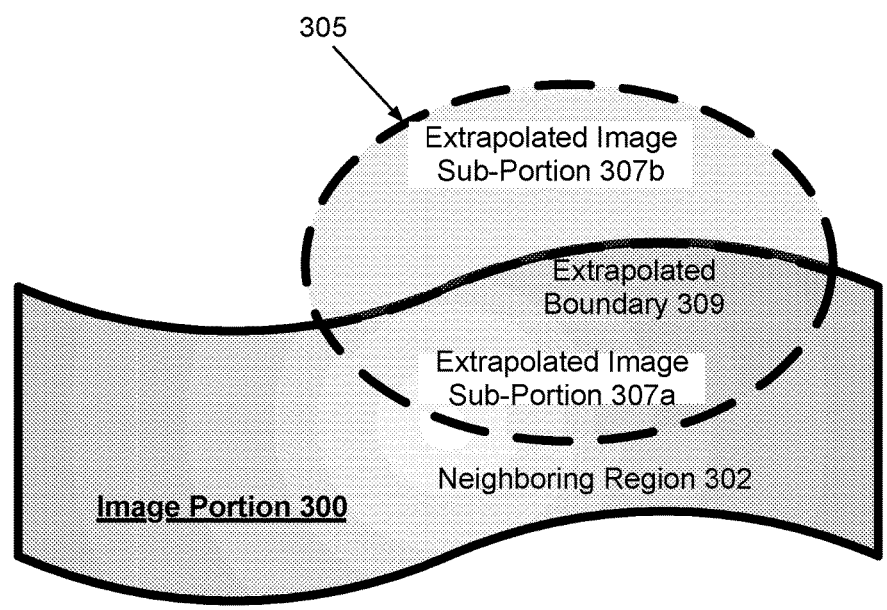

FIG. 3A and FIG. 3B illustrate an example extrapolation based corrective process, implemented on image portions captured with an example scanner, such as described with FIG. 2. According to some aspects, the controller 206 of scanner 200 can execute the image correction instructions 223 to capture a reference image (e.g., of the reflection medium 219).

In FIG. 3A, an image portion 300 of a reference image can be processed to identify an image flaw 301 (or cluster of pixels) which are attributable to a defect or image corruption item (e.g., scratch of transparent surface 218, dust or debris, etc.). The image portion 300 can be processed in order to identify a boundary 301b of the image flaw 301, as well as a relevant neighboring region 302. The relevant neighboring region 302 can be determined by, for example, analysis of pixel values on a case-by-case basis, or by a specific approximation for any image which uses a same defects map.

In FIG. 3B, extrapolation techniques are implemented on the relevant neighboring region 302 in order to replace pixels of the image flaw 301 with extrapolated pixel values, as shown by extrapolated image sub-portions 307a, 307b. The extrapolation techniques can include a linear or a curvilinear extrapolation between at least a pair of intersection points formed at respective intersections of a boundary 301b of the image flaw, using pixel values of the relevant neighboring region 302. The extrapolated portions 307a, 307b can include an extrapolated boundary 309, which can be blended or transitioned, depending on the image processing technique employed.

With extrapolation, a corrected scan image portion can be generated, with a replacement image portion 305 substantially eliminating the image flaw. In an example, the corrected scan image may be replicated via photocopying onto a paper medium. In another example, a corrected image with the replacement image portion 305 can be stored with the memory resources 208 of scanner 200. As an addition or alternative, the corrected scan image can be communicated from the scanner 200 to another device via the communication component 228.

Figure 4:
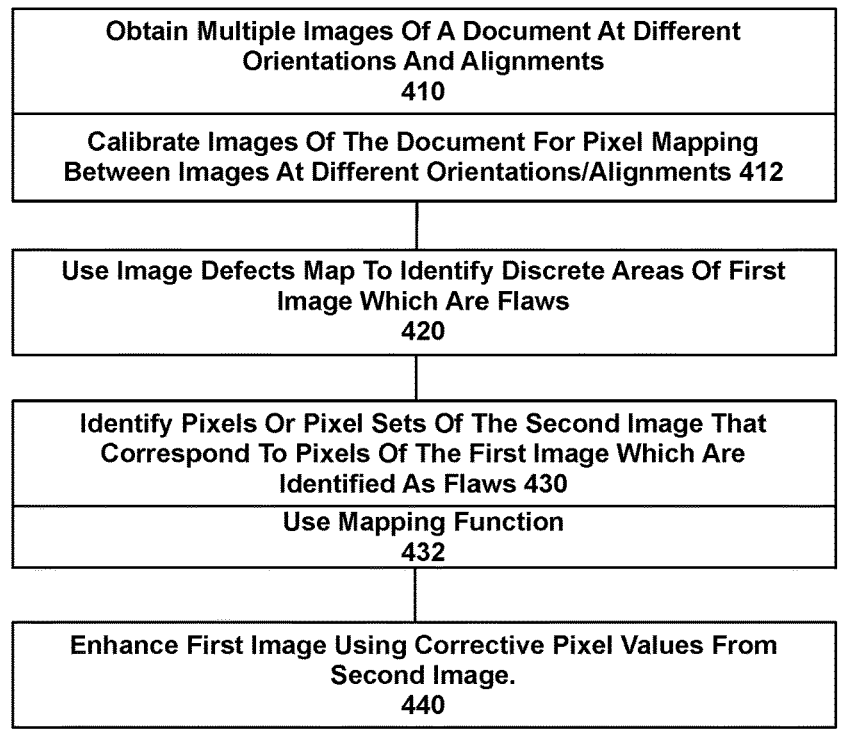
FIG. 4 illustrates an example of image shifting corrective process, for implementation with a scanner such as described with an example of FIG. 2.

FIG. 4 illustrates an example of image shifting corrective process, for implementation with a scanner such as described with an example of FIG. 2. According to some examples, the controller 206 of scanner 200 executes the image correction instructions 223 to implement an example image shifting corrective process, as described. The controller 206 may store, determine or otherwise have access to an image defects map 225, in when performing an image shifting corrective process as described.

With further reference to an example of FIG. 4, the controller 206 obtains multiple images of a document, including at least two images of the document positioned at different orientations or alignments respect to the transparent surface 218 (410). With reference to an example of FIG. 2, the variation in the placement of the document on the transparent surface 218 can be differentiated by orientation and/or displacement. For example, in one implementation, the controller 206 may scan a document placed on the transparent surface 218 (e.g., a platen) in a first orientation (e.g., top-to-bottom orientation) in order to obtain a first image. The first image may provide for the document to have the alignment used for the reference image. Once the first images captured, the controller 206 may trigger or otherwise receive a second image of the document, scanned again after being placed on the transparent surface 218 in a different orientation for alignment. For example, the document may be placed on the transparent surface to have a reverse orientation (e.g., bottom-to-top orientation). In such an implementation, the controller 206 can implement a mapping function that account for the variation in the orientation or alignment of the document for the second image (e.g., reverse orientation). As an addition or variation, the document being scanned can be displaced laterally on the transparent surface 218, and the mapping function can account for the displacement of the pixels in order to correlate pixel values of the second image to discrete areas of the first image.

When the scanner 200 images a document at different angles, the placement and scan of the document may be calibrated to enable pixel mapping between images at different orientations or alignments (412). In some variations, the scanner 200 can include a hardware resource that is controllable by the controller 206 in order to manipulate the document between the first and second respective orientations or alignments. According to some examples, the scanner may calibrate the document intake mechanism based on input or setting information which identifies a size of the document being scanned. In other variations, the image capture sub-system includes includes a document edge detection feature to calibrate the initial start point and/or end point of a scan in one or both directions (e.g., forward and reverse) to the detected document edge.

In variations, a manual or partially manual process can be facilitated in order to guide the user to manipulating the document into multiple positions or alignments. For example, the scanner 200 can generate or otherwise provide guide markers which guide the user to place the document in each orientation, in order to enable accurate mapping as between the images of the document in the two orientations.

As another variation, the controller 206 can include logic that can analyze pixel values surrounding each discrete flaw area of the first image of the document in order to determine a signature that can then be used to identify the corresponding pixels in the second image of the document.

For a first image of the document, the controller 206 uses the image defects map to identify pixels or pixel sets that form discrete areas which are identified as flaws, according to the image defect map 225 (420).

Additionally, controller 206 uses the image defects map 225 to identify pixels or pixel sets of a second image that correspond to pixels of the first image which are identified as flaws from the image defects map 225 (430). In determining the correspondence between pixels or pixel sets of the second image, the controller 206 may implement a mapping function (432). The variation in the placement of the document on the transparent surface 218 can be differentiated by orientation and/or displacement. For example, in one implementation, the controller 206 may scan a document placed on the transparent surface 218 (e.g., a platen) in a first orientation (e.g., top-to-bottom orientation) in order to obtain a first image. The first image may provide for the document to have the alignment used for the reference image. Once the first images captured, the controller 206 triggers to have the document scanned again, when the document is placed on the transparent surface 218 in a different orientation for alignment. For example, the document may be placed on the transparent surface to have a reverse orientation (e.g., bottom-to-top orientation).

In such an implementation, the controller 206 can implement a mapping function that accounts for the variation in the orientation or alignment of the document for the second image (e.g., reverse orientation). As an addition or variation, the document being scanned can be displaced laterally on the transparent surface 218, and the mapping function can account for the displacement of the pixels in order to correlate pixel values of the second image to discrete areas of the first image.

The controller 206 may then enhance the first image by correcting the pixels which are identified as flaws using the corrective pixel values from the second image (440). The corrective pixel values can be used to replace some or all of the pixels that are identified as flaws.

As an addition or alternative, some or all of the pixel which are identified as flaws can be corrected through use of an extrapolation based corrective process 133 (see FIG. 1), using neighboring pixels and/or neighboring pixels that are corrected with corrective values from the second image.

By way of example, a document feeder for a scanner can implement a scan job by scanning the document in a first orientation (e.g., top-down, with content portion facing inward), then physically manipulate the document into a reverse position (e.g., bottom-up, with content portion facing inward) before scanning the document again. In such variations, the controller 206 executes the image corrective instructions 223 to identify, from the image defects map 225, discrete areas (e.g., sets of clustered pixels) of a first captured image of the document where image flaws are present. Additionally, the controller 206 executes the image corrective instructions 223 to identify, from the image defects map, corrective pixel values from pixels of the second captured image which correspond to pixels of the discrete areas of the first captured image. The image corrective instructions 223 can enhance the first image by replacing the pixel values of the discrete areas with corrective pixel values identified from the second image.

Figure 5:
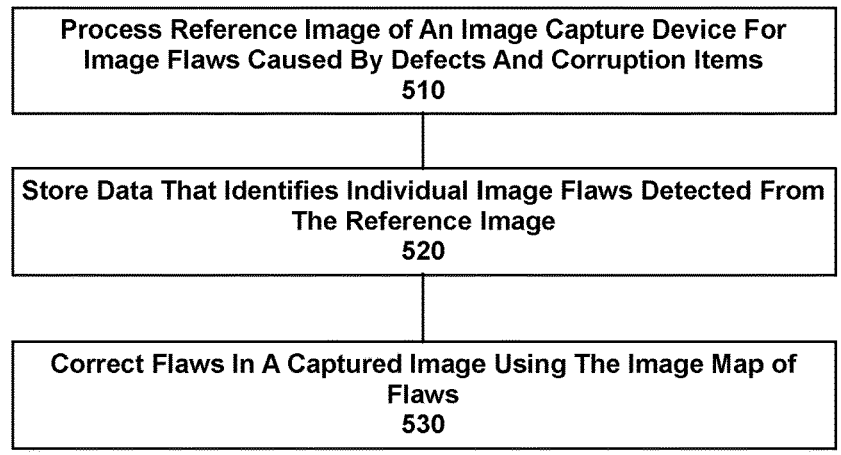
FIG. 5 illustrates an example method for performing image correction.

FIG. 5 illustrates an example method for performing image correction. An example of FIG. 5 can be implemented using an example image capture system of FIG. 1, or an example scanner of FIG. 2. Accordingly, reference may be made to elements of FIG. 1 or FIG. 2 for purpose of illustrating suitable components for implementing a step or sub-step being described.

With reference to FIG. 5, a reference image of an image capture system 100 is processed to detect image flaws caused by defects or corruption items of the image capture device (510). For example, the scanner 200 can include defects in the form of scratches or markings formed on the transparent surface 218, which result in the formation of dark spots on a scanned image. Alternatively, image flaws can be the result of debris on a scan bed. The reference image can be captured by performing a scan of a homogeneous and reflective surface, such as of reflective medium 219. For example, the scanner 200 can be used to obtain the zero image using the reflective medium, and the zero image can be used for the reference image.

The image capture system 100 can store data that identifies individual image flaws detected from the reference image (520). For example, the stored data can identify a relative location of individual pixels of each detected image flaw, and/or a shape (or perimeter boundary) and dimension of each identified image flaw. In some examples, the scanner 200 can store data corresponding to an image map of flaws (e.g., defects map 225). In such examples, the defects map 225 can identify image flaws as blackened areas that contrast with the homogenous nature of the reflective medium 219 that is the source of the zero image. The defects map 225 can identify the image flaws by pixel or pixel location of darkened or contrasting spots. In variations, the defects map 225 can identify the image flaws by relative location, size, and/or perimeter shape of contrasting spots in the zero image.

Subsequently, when an actual image capture is performed, flaws in the captured image can be corrected using the image map of flaws (530). For example, the controller 206 of the scanner 200 can be used to extrapolate the neighboring pixel area of an image flaw that was previously detected in the zero image. The controller can use image-processing techniques, such as image extrapolation, in order to compensate and correct for regions of the scanned image which are previously identified in the defects map 225 as locations of image flaws.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating an image capture device, the method comprising:
    processing a reference image of the image capture device to detect an image flaw caused by a defect or corruption item of the image capture device;
    storing data corresponding to an image defects map which identifies the detected image flaw for the image capture device; and
    responsive to capturing a first image of a document or object on an image capture surface, correcting a flaw in the first image using the image defects map, wherein correcting the flaw in the first image comprises:
        using the image defects map to identify pixels in the first image which correspond to the detected image flaw; and
        extrapolating pixel values from a neighboring region of the identified pixels, wherein the extrapolating includes performing extrapolation between at least a pair of intersection points formed at respective intersections of a boundary of the detected image flaw.

2. The method of claim 1, further comprising capturing the reference image by scanning a reflection medium of uniform reflection, so that the image flaw appears as a non-homogeneous aspect to a reference media.

3. The method of claim 2, wherein the reference media is white.

4. The method of claim 1, wherein the detected image flaw is caused by a defect of a transparent layer or debris.

5. The method of claim 1, wherein the image capture device corresponds to a scanner.

6. The method of claim 1, wherein the image capture device corresponds to a scanner, and wherein the method further comprises scanning the document or object to obtain the reference image from which the pixels that correspond to the detected image flaw is identified.

7. The method of claim 6, wherein the image capture surface comprises a transparent surface of the scanner.

8. The method of claim 1, wherein the extrapolating is performed using linear or curvilinear extrapolation.

9. A non-transitory computer-readable medium that stores instructions, which when executed by at least a processor of an image capture system, cause the image capture system to:
    process a reference image of the image capture system to detect an image flaw caused by a defect or corruption item of the image capture system;
    store data corresponding to an image defects map which identifies the detected image flaw for the image capture system; and
    responsive to capturing first image of a document or object on an image capture surface, correct a flaw in the first image using the image map, wherein to correct the flaw in the first image is to:
        use the image defects map to identify pixels in the first image which correspond to the detected image flaw; and
        extrapolate pixel values from a neighboring region of the identified pixels, wherein the extrapolation includes extrapolation between at least a pair of intersection points formed at respective intersections of a boundary of the detected image flaw.

10. The non-transitory computer-readable medium of claim 9, wherein the extrapolation is performed using linear or curvilinear extrapolation.

11. An image capture device comprising:
   memory resources;
   a processor to;
      process a reference image to detect an image flaw caused by a defect or corruption item of the image capture device;
      store data in the memory resources corresponding to an image map of the detected image flaw for the image capture device; and
      responsive to capturing first image of a document or object on an image capture surface, correct a flaw in the first image using the image map, wherein to correct the flaw in the first image is to:
      use the image defects map to identify pixels in the first image which correspond to the detected image flaw; and
      extrapolate pixel values from a neighboring region of the identified pixels, wherein the extrapolating includes performing extrapolation between at least a pair of intersection points formed at respective intersections of a boundary of the detected image flaw.

12. The image capture device of claim 11, wherein the extrapolation is performed using linear or curvilinear extrapolation.

* * * * *